(12) United States Patent
Kownacki

(10) Patent No.: US 7,162,841 B2
(45) Date of Patent: Jan. 16, 2007

(54) SPRING CLIP AND METHOD OF WINDOW INSTALLATION

(76) Inventor: Charles D. Kownacki, 3675 Julie Ct., Erie, PA (US) 16506

( * ) Notice: Subject to any disclaimer, the term of this patent is extended or adjusted under 35 U.S.C. 154(b) by 206 days.

(21) Appl. No.: 10/778,692

(22) Filed: Feb. 13, 2004

(65) Prior Publication Data
US 2005/0193656 A1   Sep. 8, 2005

(51) Int. Cl.
E06B 1/62 (2006.01)
E06B 1/64 (2006.01)

(52) U.S. Cl. ............ 52/213; 52/217; 52/714; 403/382

(58) Field of Classification Search ............ 52/698, 52/214, 213, 211, 217, 212, 714, 741.1; 24/305, 24/326–327, 350, 572.1, 586.1, 587.1, 589.1, 24/593.1, 628–629; 403/326, 329–330, 403, 403/404, 382
See application file for complete search history.

(56) References Cited

U.S. PATENT DOCUMENTS

| 2,208,722 A | * | 7/1940 | Doty | 24/457 |
| 2,216,219 A | * | 10/1940 | Wiley | 24/293 |
| 2,316,829 A | * | 4/1943 | Zecca | 403/345 |
| 2,722,170 A | * | 11/1955 | Johan | 454/332 |
| 2,823,071 A | * | 2/1958 | Edward | 49/440 |
| 3,378,973 A | * | 4/1968 | Tudor-Pole | 52/466 |
| 3,403,881 A | * | 10/1968 | Chilton et al. | 411/532 |
| 3,654,731 A | * | 4/1972 | Jellinek | 49/504 |
| 3,741,068 A | * | 6/1973 | Andruskiewicz | 411/461 |
| 4,488,391 A | * | 12/1984 | Pavnica | 52/745.16 |
| 4,986,044 A | * | 1/1991 | Funari | 52/213 |
| 5,099,546 A | * | 3/1992 | Mackal | 16/110.1 |
| 5,347,691 A | * | 9/1994 | Terazoe | 24/295 |
| 5,365,707 A | * | 11/1994 | Jones et al. | 52/211 |
| 5,376,423 A | * | 12/1994 | Wiegand | 428/99 |
| 5,377,464 A | * | 1/1995 | Mott et al. | 52/213 |
| 5,584,549 A | * | 12/1996 | Lybarger et al. | 312/265 |
| 5,655,334 A | * | 8/1997 | Kwiatkowski | 52/24 |
| 5,670,076 A | * | 9/1997 | Leek | 249/53 M |
| 6,253,507 B1 | * | 7/2001 | Martino | 52/211 |
| 6,499,198 B1 | * | 12/2002 | Eckenrode | 24/295 |
| 6,625,041 B1 | * | 9/2003 | Chen | 361/829 |
| 6,745,523 B1 | * | 6/2004 | Petta | 52/213 |
| 6,804,916 B1 | * | 10/2004 | Myers | 52/62 |

* cited by examiner

Primary Examiner—Jeanette E. Chapman
(74) Attorney, Agent, or Firm—Richard K. Thomson

(57) ABSTRACT

A spring clip having integral, self-penetrating attachment tangs and an orientation tab can be manually installed in a window opening formed by a foam core sandwiched by a pair of OSBs. A first planar surface has a second planar surface attached along one lateral edge thereof and oriented at an angle in the range between 60° and 85°. This spring finger deflects out of the way permitting the window's insertion, snapping back to engage a vertically extending flange on the window to retain it in the opening. A modified spring clip for use with solid wood headers and sills utilized with multi-unit windows is also disclosed.

5 Claims, 5 Drawing Sheets

SPRING CLIP AND METHOD OF WINDOW INSTALLATION

BACKGROUND AND SUMMARY OF THE INVENTION

The present invention is directed to the construction business. More particularly, the present invention is directed to a spring clip to facilitate window installation and the associated method of installation.

More specifically, the present invention is directed to a spring clip which has been specifically designed to decrease the amount of labor (time) needed to install a typical window in a standard framed home or a house built using a structural, insulated panel system (SIPS). Typically, a vinyl or wood window is manufactured with a nailing flange extending around the perimeter of the window. Window installation will usually require at least two installers, especially for windows being installed on the second (or higher) floor. Squaring and centering of the window is usually performed by the second installer while the first supports its weight, then secures it in the opening.

SIPS construction involves manufacturing walls by sandwiching an insulating foam layer with a pair of oriented strand boards (OSBs) at the factory. The window openings are precisely positioned by computer controlled routers cutting away the OSB at the desired locations. Laborers using hot wire cutters or routers remove foam around the periphery of the opening to afford room for the framing lumber to be added around the perimeter. While the framing lumber performs three functions, it adds significantly to the labor cost and materials associated with window installation. These three functions are providing: 1) attachment points for the window, 2) structural integrity to the window opening, and 3) a fire barrier. The presence of framing lumber around the windows can slow the advance of the fire by up to 15 minutes as compared to the foam in the SIPS construction.

The spring clip of the present invention makes the inclusion of a nailing flange unnecessary, obviates the need for multiple installers and eliminates the need for installing framing lumber for standard size windows. The clips of the present invention replace other fastening clips which are screwed or nailed in place or other more time-consuming installation techniques. The spring clip is designed to penetrate portions of the insulating foam, have a tongue which is sandwiched between the OSB and the foam to ensure accurate positioning, and a spring finger which retracts to facilitate insertion of the window in the opening and then snaps back to engage a flange on the window unit to retain the window unit in the opening. An alternate fire barrier applied as a tape or spray coating will reduce the rate of fire propagation.

In a first aspect of the invention, the spring clip comprises a first planar surface; a first upper edge portion extending outwardly at a first angle to and projecting from the first planar surface on a first side thereof, the first upper edge portion having first and second integral, self-penetrating attachment means; a second lower edge portion extending outwardly at a second angle to and projecting from the first planar surface on the first side thereof, the second lower edge portion having third and fourth integral, self-penetrating attachment means; a second planar surface attached to the first planar surface along at least a portion of a length of a first lateral edge, the second planar surface forming a third angle with the first planar surface in a range between 60° and 85° and extending inwardly from a second side thereof opposite to the first side; whereby a plurality of the spring clips may be positioned in the opening by pressing said self-penetrating attachment means into an inwardly protruding face of the opening and the window snapped into the opening equipped with the plurality of spring clips. Preferably, the first and second angles are substantially right angles and the third angle is 75°. The second planar surface is also preferably attached along the entire length of said first lateral edge of said first planar surface and an orientation tab extends outwardly from the first side of the first planar surface.

A second aspect of the invention includes a method of installing a conventional window in an opening in a composite SIPS wall wherein the wall includes first and second rigid boards sandwiching a foam core, the method comprising the steps of positioning at least first and second spring clips in the opening along a first lateral face by manually pressing self-penetrating attachment means integrally formed on said spring clip into the foam core; positioning at least third and fourth spring clips in the opening along a second lateral face by manually pressing self-penetrating attachment means integrally formed on the spring clip into the foam core; snapping the window into the opening with the spring clips engaging a vertically extending flange on the window. The method may include the additional step of applying a fire retardant barrier to the exposed foam surfaces.

In a third aspect of the invention, a method of installing a multi-unit window in an opening in a composite wall is disclosed, wherein the wall includes a rigid header, and first and second rigid boards sandwiching a foam core, said method comprising the steps of nailing at least one specially configured spring clip to the rigid header; positioning at least first and second spring clips in the opening along a first lateral face by manually pressing self-penetrating attachment means integrally formed on said spring clip into the foam core; positioning at least third and fourth spring clips in the opening along a second lateral face by manually pressing self-penetrating attachment means integrally formed on the spring clip into the foam core; snapping the window into the opening with the spring clips engaging a vertically extending flange on the window. Once again, the method may include the additional step of applying a fire retardant barrier to the exposed foam surfaces.

Various other features, advantages and characteristics of the present invention will become apparent to one of ordinary skill in the art after a reading of the following specification.

BRIEF DESCRIPTION OF THE DRAWINGS

The preferred embodiments of the present invention are described in conjunction with the associated drawings in which like features are indicated with like reference numerals and in which.

DETAILED DESCRIPTION OF PREFERRED EMBODIMENT(S)

Figure 2:
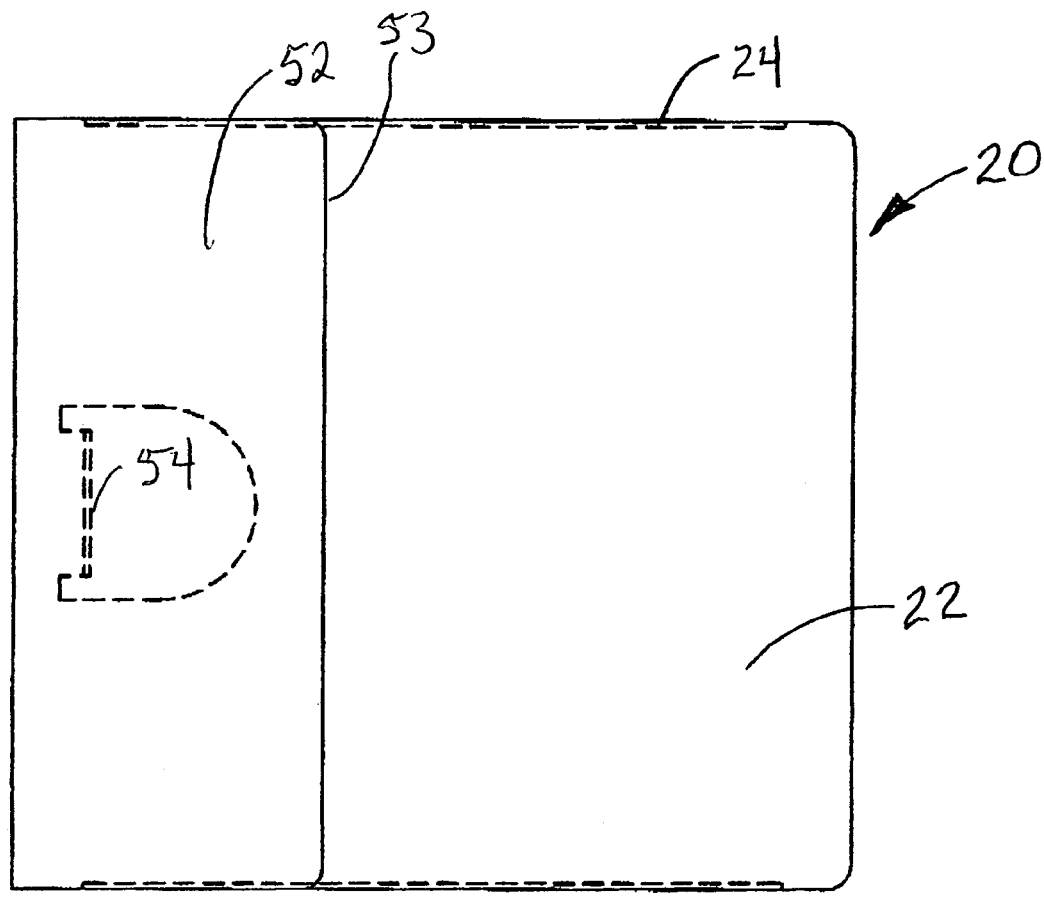
FIG. 2 is a front view of the first embodiment.
Figure 1:
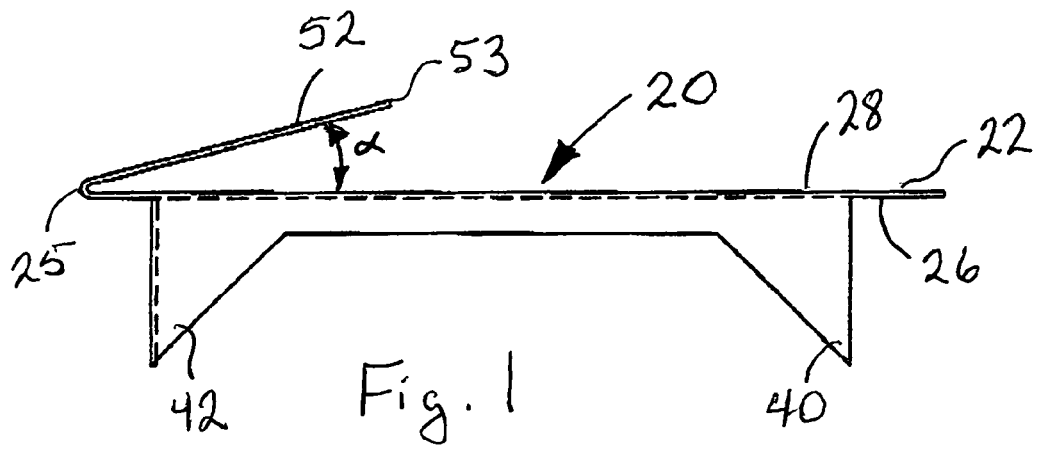
FIG. 1 is a side view of a first embodiment of the spring clip of the present invention.
Figure 3:
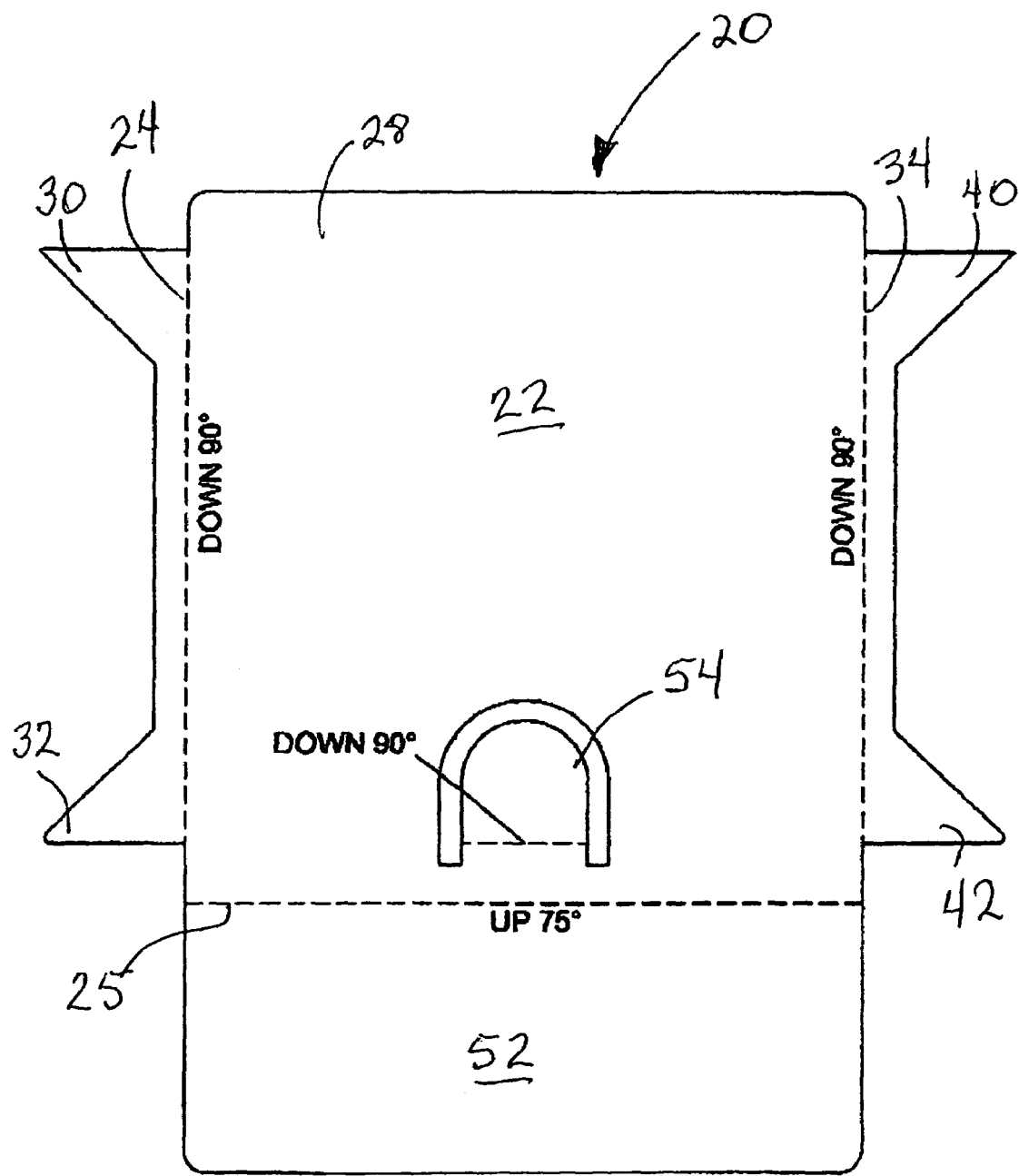
FIG. 3 is a top view of the blank from which the spring clip of the first embodiment is formed.

A first preferred embodiment of the spring clip of the present invention is shown in FIGS. 1–3 generally at 20. Spring clip 20 comprises a first planar surface 22 with a first upper edge portion 24 extending outwardly at a first angle to and projecting from the first planar surface 22 on a first side 26 thereof. Planar surface 22 has a second opposite side 28. First upper edge portion 24 has first and second integral, self-penetrating attachment means in the form of tangs 30, 32, respectively (FIG. 3), formed thereon. Second lower edge portion 34 extends outwardly at a second angle to and projecting from the first planar surface 22. Second lower edge portion 34 has third and fourth integral, self-penetrating attachment means, or tangs, 40, 42, respectively, formed thereon. The first and second angles are preferably, right angles or substantially right angles. A second planar surface 52 is attached to the first planar surface 22 along at least a portion of a length of a first lateral edge 25, the second planar surface 52 forming a third angle $\alpha$ therewith in a range between 60° and 85° and extending inwardly from the second side 28. Preferably, the third angle $\alpha$ is 75°. Orientation tab 54 extends outwardly from the first side 26 of the first planar surface 22 also, preferably, at a right angle.

Figure 4A:
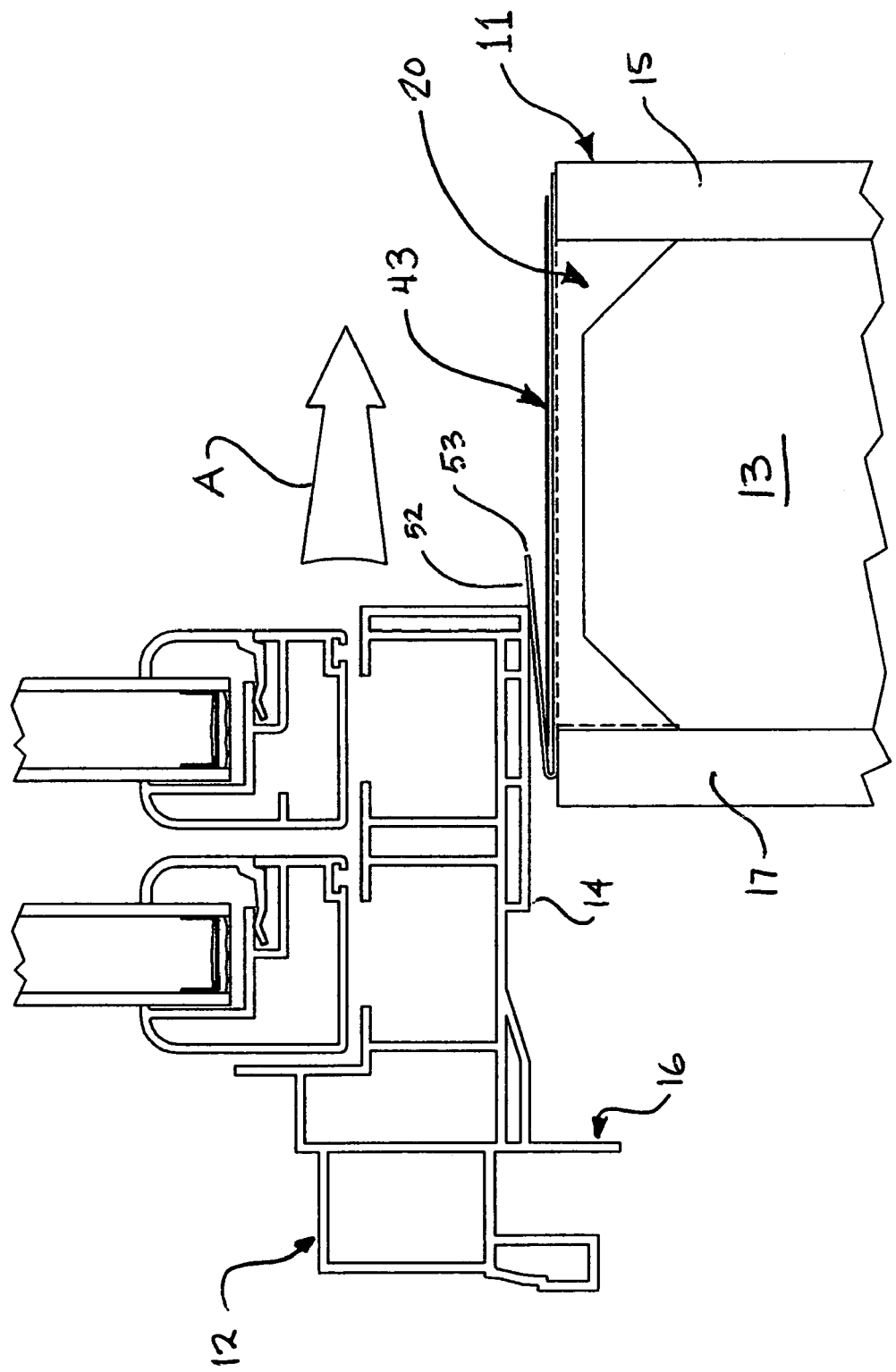
FIG. 4A is a schematic top view depicting a step in the window installation process.
Figure 4B:
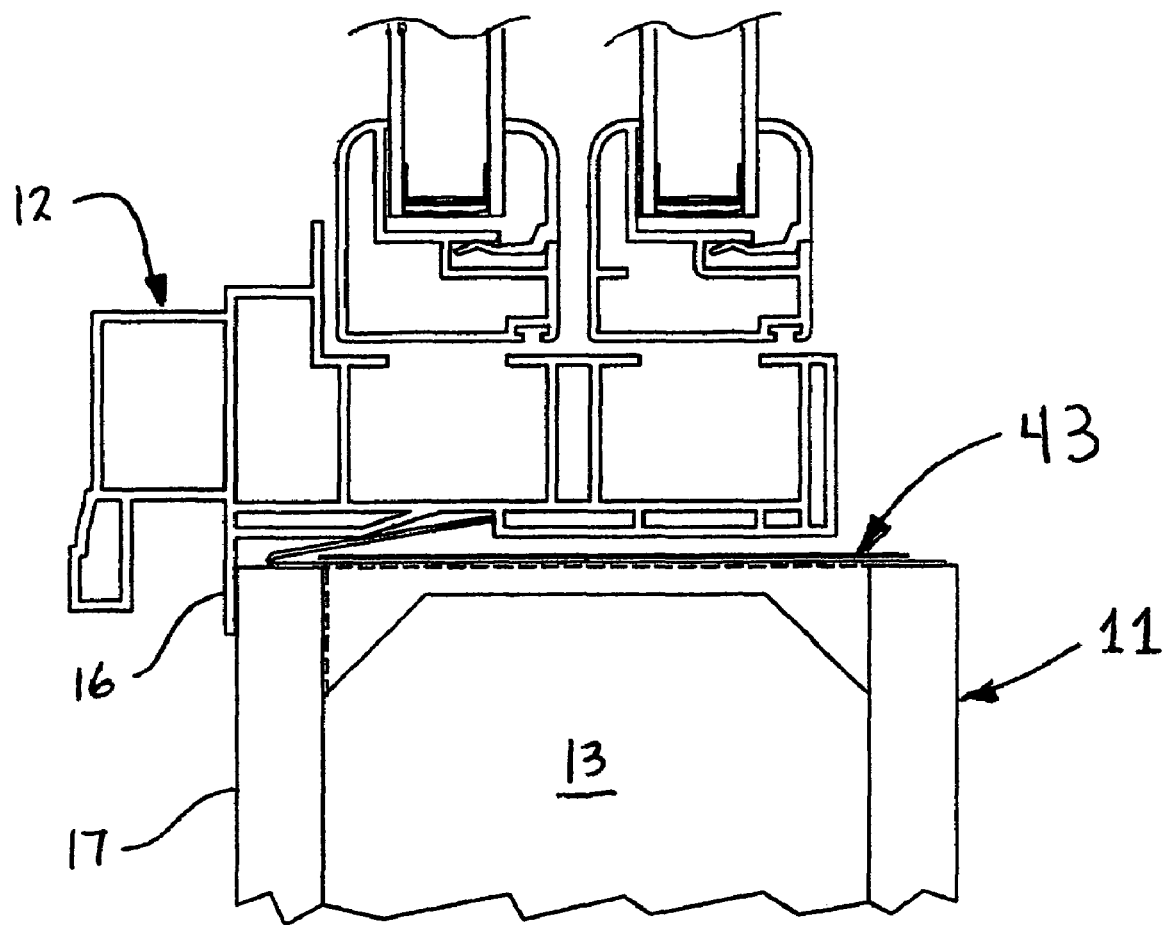
FIG. 4B is a schematic top view showing the clip contacting the installed window.
Figure 5:
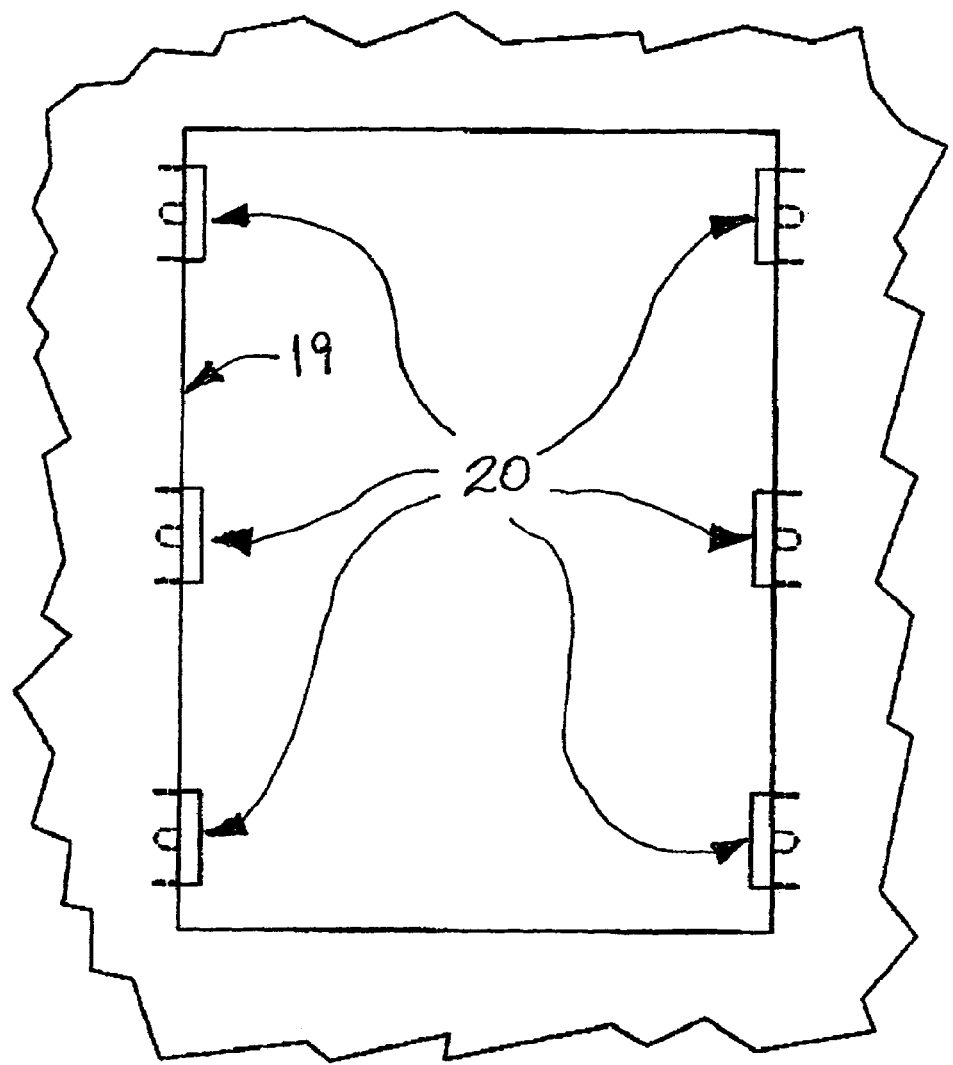
FIG. 5 is a front schematic depicting the distribution of spring clips in one installation.

The spring clip 20 of the present invention is specifically designed for use with modern day SIPS construction, namely, composite walls 11 formed by sandwiching a 4" layer of insulating foam 13 with two sheets of OSB (oriented strand board) 15 and 17. In using the spring clip of the present invention to install a conventional window, at least two clips 20 are positioned on each side of the opening 19 (FIG. 5). Orientation tab 54 is positioned just inside OSB 17 between OSB 17 and foam layer 13 and self-penetrating means 30, 32, 40, 42 are pushed into the foam layer 13, either manually or gently using a hammer. For the example depicted in FIG. 5, three spring clips 20 are positioned on each side of the window opening 19 (the number will vary depending on the size of the window). Then, as depicted in FIG. 4A, window 10 is slipped into opening 19 by moving it in the direction of arrow A. Frame 12 will compress spring clip 20 by pushing second planar surface 52 toward first planar surface 22. As seen in FIG. 4B, when the front face of flange 14 of window frame 12 passes the edge 53 of second planar surface 52, second planar surface 52 of spring clip 20 snaps outwardly restoring it to its undeflected position and second planar surface 52 retains window 10 in an installed position with frame flange 16 flush against OSB 17. An alternative fire retardant layer 43 is applied to the periphery of window opening 19. This layer 43 may, for example, take the form of a fire retarding coating applied as a spray or a cotton or fiberglass tape treated with such a coating.

Figure 6:
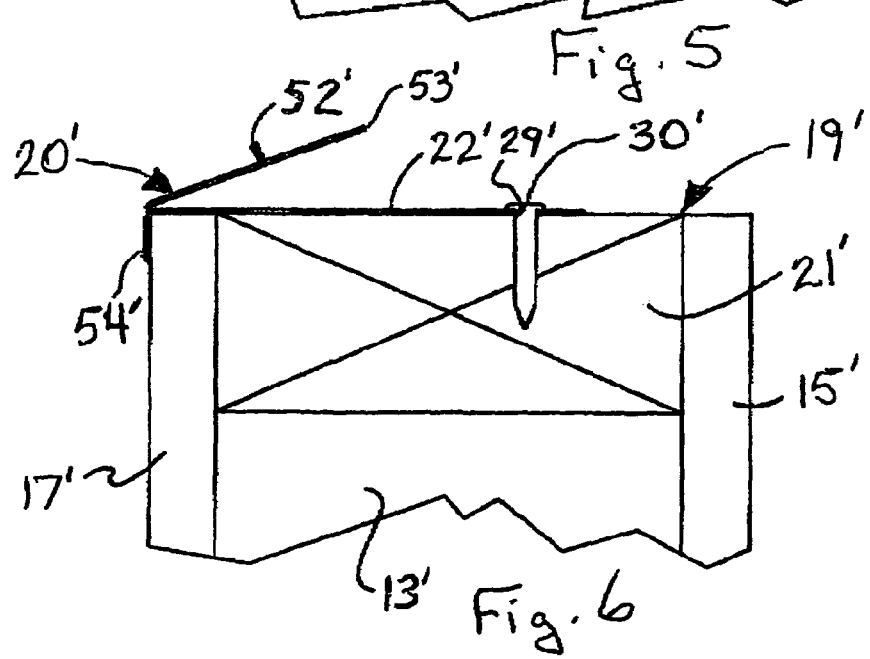
FIG. 6 is a side view of an alternate clip configuration for use with a solid wood header.

Wide, multi-unit windows are heavier and subject to possible deflection. To prevent this mis-orientation of these windows, solid wood headers and sills 21' are installed over foam layer 13' (FIG. 6). One or more modified spring clips 20' are employed along the width of opening 19'. In lieu if self-penetrating fasteners, modified spring clip 20' has a nail-receiving hole 29' centered on the width of first planar surface 22' by which nail 30' can secure modified spring clip 20' to solid wood sill (or header) 21'. Orientation tab 54' engages the outside surface of OSB 19' and, accordingly, second planar surface 52' has a longer length so that its edge 53' occupies the same plane as the edges 53 of standard spring clips 20. This ensures proper alignment of the multi-unit window in opening 19'. Second planar surface 52' will be deflected by the 12 and edge 53' will engage a horizontally extending flange (not shown) corresponding to vertical flange 14.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A spring clip for use in securing a window in an opening, said spring clip comprising
    a) a first planar surface;
    b) a first upper edge portion extending outwardly at a first angle to and projecting from said first planar surface on a first side thereof, said first upper edge portion having first and second integral, self-penetrating attachment means forming an extension of and extending in a same general direction as said first upper edge portion;
    c) a second lower edge portion extending outwardly at a second angle to and projecting from said first planar surface on said first side thereof, said second lower edge portion having third and fourth integral, self-penetrating attachment means forming an extension of and extending in a same general direction as said second lower edge portion;
    d) a second planar surface attached to said first planar surface along at least a portion of a length of a first lateral edge, said second planar surface forming a third angle with said first planar surface in a range between 60° and 85° and extending inwardly from a second side thereof opposite to said first side;
    whereby a plurality of said spring clips may be positioned in the opening by pressing said self-penetrating attachment means into an inwardly protruding face of the opening and the window snapped into the opening equipped with said plurality of spring clips.

2. The spring clip of claim 1 wherein said first and second angles are substantially right angles.

3. The spring clip of claim 1 wherein said third angle is 75°.

4. The spring clip of claim 1 wherein said second planar surface is attached along the entire width of said first lateral edge of said first planar surface.

5. The spring clip of claim 1 further comprising an orientation tab extending outwardly from said first side of said first planar surface.

* * * * *